(12) United States Patent
Candelier et al.

(10) Patent No.: US 11,707,052 B2
(45) Date of Patent: Jul. 25, 2023

(54) ANIMAL FEED DISPENSER

(71) Applicants: SORBONNE UNIVERSITE, Paris (FR); CENTRE NATIONAL DE LA RECHERCE SCIENTIFIQUE (CNRS), Paris (FR)

(72) Inventors: Raphael Candelier, Paris (FR); Abdelkrim Mannioui, Villiers sur Marne (FR); Alex Bois, Mereville (FR); Stephane Tronche, Paris (FR); Jeremy Mahieu, Clasville (FR)

(73) Assignees: SORBONNE UNIVERSITE, Paris (FR); CENTRE NATIONAL DE LA RECHERCE SCIENTIFIQUE (CNRS), Paris (FR)

( * ) Notice: Subject to any disclaimer, the term of this patent is extended or adjusted under 35 U.S.C. 154(b) by 71 days.

(21) Appl. No.: 16/976,984

(22) PCT Filed: Nov. 9, 2018

(86) PCT No.: PCT/EP2018/080846
§ 371 (c)(1),
(2) Date: Aug. 31, 2020

(87) PCT Pub. No.: WO2019/166115
PCT Pub. Date: Sep. 6, 2019

(65) Prior Publication Data
US 2021/0000070 A1 Jan. 7, 2021

(30) Foreign Application Priority Data

Mar. 1, 2018 (FR) ........................................ 1851816

(51) Int. Cl.
*A01K 5/02* (2006.01)
*A01K 61/80* (2017.01)

(52) U.S. Cl.
CPC ............ *A01K 5/0283* (2013.01); *A01K 61/80* (2017.01)

(58) Field of Classification Search
CPC ...... A01K 5/02; A01K 5/0283; A01K 5/0275; A01K 7/02; A01K 61/80; A01K 61/85;
(Continued)

(56) References Cited

U.S. PATENT DOCUMENTS 2,929,355 A 3/1960 Paquette
3,192,915 A 7/1965 Norris et al.
(Continued)

FOREIGN PATENT DOCUMENTS

EP 2263452 A1 12/2010
GB 2241858 A 9/1991
WO 2009/072982 A1 6/2009

OTHER PUBLICATIONS

International Preliminary Reporton Patentability received for PCT Patent Application No. PCT/EP2018/080846, dated Sep. 10, 2020, 16 pages (8 pages of English Translation and 8 pages of Original Document).

(Continued)

*Primary Examiner* — Joshua E Rodden
*Assistant Examiner* — Henry Hooper Mudd
(74) *Attorney, Agent, or Firm* — Thomas | Horstemeyer, LLP

(57) ABSTRACT

An animal feed dispenser includes a control module and a feed dispensing module. The control module includes a detection member and an electronic control card. The detection member is suitable for generating a detection signal when the feed dispenser is located close to an enclosure containing animals. The feed dispensing module includes a feed dispensing orifice and an actuator. The electronic control card is configured to receive the detection signal and, as a function of the detection signal, to transmit an activation signal to the actuator and the actuator is configured to trigger a flow of feed through the dispensing orifice when the activation signal is received.

25 Claims, 9 Drawing Sheets

Figure 1:
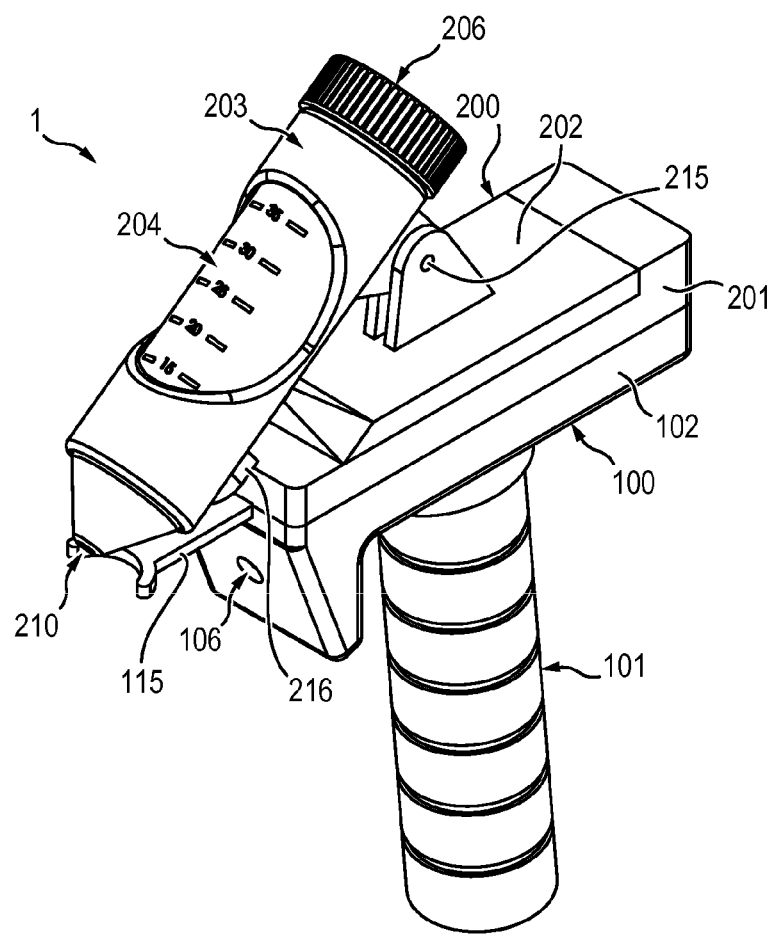

(58) Field of Classification Search
CPC .. A01K 5/0225; A01K 5/0291; A01K 5/0114; A01K 1/0356; A01K 31/005
USPC ......... 119/51.04, 51.11, 51.12, 51.13, 51.14, 119/210, 212, 230, 242, 417, 454, 456, 119/457
See application file for complete search history.

(56) References Cited

U.S. PATENT DOCUMENTS

| | | | |
|---|---|---|---|
| 4,508,061 A * | 4/1985 | Swearingin | A01K 5/00 119/51 R |
| 2017/0202178 A1 | 7/2017 | Gordon et al. | |
| 2017/0223926 A1* | 8/2017 | Ausman | A01K 5/02 |
| 2018/0092331 A1* | 4/2018 | Zuidhof | A01K 5/0142 |

OTHER PUBLICATIONS

International Search Report and Written Opinion received for PCT Patent Application No. PCT/EP2018/080846, dated Jan. 31, 2019, 20 pages (9 pages of English Translation and 11 pages of Original Document).

Preliminary Research Report received for French Application No. 1851816, dated Oct. 26, 2018, 3 pages (1 page of French Translation Cover Sheet and 2 pages of original document).

* cited by examiner

ANIMAL FEED DISPENSER

FIELD OF THE INVENTION

The invention relates to an animal feed dispenser. The invention relates in particular to a feed dispenser for use in animal facilities in which the animals are raised in tanks stored on racks.

STATE OF THE ART

Some fish, such as zebrafish (*Danio rerio*), are increasingly used in research as model organisms. These fish indeed have an interesting genetic inheritance that shows similarities with that of humans. In addition, zebrafish has excellent reproductive capacities and its embryos are transparent, which makes them suitable for the use of optogenetic and optopharmacological techniques.

These fish are generally raised within research laboratories, in dedicated animal facilities or in commercial animal facilities, which can gather several tens of thousands of individuals. In these animal facilities, fish are distributed in bins, the bins being stored on racks. Each bin typically contains between one and fifty individuals.

Several times a day, operators must deliver feed to fish. Feed can be solid feed, in the form of powder or granules, or liquid feed, containing small living organisms (for example *Artemia* or *Rotifera*).

However, because it is done manually, the feeding is extremely long and tedious.

Particularly, liquid feed must be delivered using wash bottles. However, the repeated actuation of the wash bottles by the operators over an extended period of time causes musculoskeletal disorders, severe inflammation of the arms, in particular tendonitis, and chronic pain in the arms and the shoulders.

Also, it is not possible to accurately monitor the amount of solid or liquid feed delivered. This lack of monitoring can lead to the delivery of inappropriate doses of feed. However, an insufficient dose of feed can cause growth problems in fish. On the other hand, a too large dose has the effect that feed is not entirely consumed by fish and causes water pollution, which can also have a negative effect on the health of fish.

Document EP 2 263 452 describes an automated system for dispensing feed in a animal facility comprising tanks arranged in rows, which does not require direct intervention of an operator. The described system comprises a gantry formed from a series of vertical pillars and from a horizontal beam, the gantry being installed in front of the rows of tanks. The system further comprises a carriage capable of moving along the horizontal beam (along a first horizontal direction X), a vertical rod attached to the cart, and a feed dispensing device capable of moving along the rod (along a second vertical direction Y). The feed dispensing device can thus be moved in a motorized manner along the horizontal and vertical directions. The dispensing device comprises a support head and a bottle containing feed to be dispensed. The feed dispensing device is automatically successively positioned in front of each tank and the bottle is tilted relative to the support head by means of a motorized arm to pour feed into the tank.

The advantage of such a system is that it allows accurately monitoring the dispensed amount of feed.

However, due to its large space requirement, such a system cannot be installed in all animal facilities.

In addition, due to its complexity, the system is expensive and requires significant maintenance. This maintenance can be carried out only by specialized technicians.

In addition, the dispensing of liquid feed requires in any case the presence of operators because liquid feed must be prepared at the last moment, just before the dispensing.

Finally, during feeding, the operators generally want to be able to visually observe fish, in order to be able to detect any abnormalities or to be sure of their state of health, which is not possible with this system.

SUMMARY OF THE INVENTION

One aim of the invention is to propose a simple solution for feeding the animals, which is both inexpensive and which allows accurate dosing of the dispensed feed.

This aim is achieved within the framework of the present invention thanks to an animal feed dispenser, comprising:
  a control module comprising a detection member and an electronic control board, the detection member being adapted to generate a detection signal when the feed dispenser is located in the vicinity of an enclosure containing animals,
  a feed dispensing module comprising a feed dispensing orifice and an actuator,
  wherein the electronic control board of the control module is configured to receive the detection signal and based on the detection signal, transmit to the actuator an activation signal, and the actuator is configured to initiate, when receiving the activation signal, a flow of feed through the dispensing orifice.

In such a dispenser, the flow of feed is initiated by the detection signal, thereby preventing the operator from performing repeated mechanical action that could lead to the appearance of musculoskeletal disorders.

The proposed dispenser does not require the installation of a gantry or a complex motorization system, thereby reducing the costs and eliminating the maintenance problems.

The proposed dispenser can be formed in one part. In this case, the control module and the dispensing module are fixed relative to each other and can be contained in a common casing.

Alternatively, the dispenser can be formed in two parts, namely: a control module and a separate feed dispensing module, which allows changing the feed dispensing module easily, for example to replace a solid feed dispensing module by a liquid feed dispensing module. This allows dispensing several types of feed without any risk of mixing them.

The proposed dispenser may further have the following characteristics:
  the control module comprises a casing and the detection member comprises a trigger and a switch, the trigger being movably mounted relative to the casing between a first position in which the trigger does not urge the switch and a second position in which the trigger urges the switch, the trigger being adapted to be moved from the first position to the second position when it is brought into contact with the enclosure,
  the trigger is rotatably mounted relative to the casing between the first position and the second position,
  the control module comprises a mechanism for connecting the trigger to the casing arranged to equally and interchangeably couple a trigger of a first type or a trigger of a second type different from the first type, the trigger comprises a C-shaped end adapted to bear on an annular rim surrounding an opening in the enclosure containing the animals, the electronic control board is configured to transmit an activation signal to the actuator, as long as the detection member generates the detection signal, and to stop the transmission of the activation signal as soon as the detection member no longer generates a detection signal, the electronic control board is configured to transmit an activation signal to the actuator during an activation period calculated based on information relating to the number of animals contained in the enclosure, the dispenser comprises a reader adapted to read information relating to the number of animals contained in the enclosure and to transmit the information to the electronic control board, the electronic control board being adapted to calculate a value of the amount of feed to be dispensed and/or a duration of the activation signal based on the information relating to the number of animals contained in the enclosure, the dispenser comprises a display screen, the electronic control board being adapted to control the display screen so that the screen displays in real time a value of the dispensed amount of feed as feed flows through the dispensing orifice, the feed dispensing module is adapted to be fixed to the control module, the control module comprises a first electrical connector and the feed dispensing module comprises a second electrical connector, the first electrical connector and the second electrical connector being arranged so as to be engaged with each other when the feed dispensing module is fixed to the control module, the activation signal being transmitted to the actuator via the first electrical connector and the second electrical connector, the control module comprises a first fixing member and the feed dispensing module comprises a second fixing member, adapted to cooperate with the first fixing member in order to fix the feed dispensing module to the control module, one of the first fixing member and of the second fixing member comprises rails and the other of the first fixing member and of the second fixing member comprises slides, the rails being adapted to slide in the slides in order to fix the feed dispensing module to the control module, The rails are adapted to slide in the slides along a sliding direction, and the second electrical connector is adapted to be engaged with the first electrical connector along a direction parallel to the sliding direction, the control module comprises a handle adapted to be grasped by an operator in order to position the dispenser vis-à-vis the enclosure containing the animals, the feed dispensing module comprises a reservoir adapted to contain feed to be dispensed and the actuator comprises a vibrator which is adapted, when the actuator of the feed dispensing module receives the activation signal, to impart to the reservoir mechanical vibrations causing flow of feed from the inside of the reservoir to the outside of the reservoir through the dispensing orifice, the feed dispensing opening is arranged on a wall of the reservoir, the feed dispensing module comprises a casing and a support adapted to receive the reservoir, the support being rotatably mounted on the casing, the feed dispensing module comprises a damping block disposed between the casing of the feed dispensing module and the support, the feed dispensing module comprises a dispensing nozzle and a dispensing channel extending inside the dispensing nozzle up to the dispensing orifice, and in which the actuator comprises a valve having a closed position in which the valve prohibits circulation of feed in the dispensing channel and an open position in which the valve authorizes circulation of feed in the dispensing channel, the valve being adapted to switch from the closed position to the open position when the actuator of the feed dispensing module receives the activation signal, the dispenser further comprises a reservoir adapted to contain feed to be dispensed, and a coupling tube adapted to couple the reservoir to the dispensing channel, the dispenser comprises a pump adapted to inject feed from the inside of the reservoir to the dispensing channel via the coupling tube, the dispenser comprises a stirrer adapted to mix feed contained inside the reservoir.

The invention further relates to a control module for an animal feed dispenser, comprising a detection member, an electronic control board and a first electrical connector, the detection member being adapted to generate a detection signal when the feed dispenser is located in the vicinity of an enclosure containing animals, and the first electrical connector being adapted to be engaged with a second electrical connector of a feed dispensing module when the feed dispensing module is fixed to the control module, and in which the electronic control board of the control module is configured to receive the detection signal and, based on the detection signal, to transmit to the feed dispensing module an activation signal via the first electrical connector and the second electrical connector with a view to initiating a flow of feed via a dispensing orifice of the feed dispensing module.

The invention also relates to a feed dispensing module for an animal feed dispenser, the feed dispensing module being adapted to be fixed to the control module and comprising a feed dispensing orifice, an actuator and a second electrical connector, the second electrical connector being adapted to be engaged with a first electrical connector of the control module when the feed dispensing module is fixed to the control module, and in which the actuator is adapted to receive an activation signal transmitted by the control module via the first electrical connector and the second electrical connector and is configured to initiate, when receiving the activation signal, a flow of feed through the dispensing orifice.

Finally, the invention relates to an animal feed dispenser set, comprising:

a control module as described above, a first feed dispensing module for dispensing solid feed, as described above, and a second feed dispensing module for dispensing liquid feed, as described above, the first feed dispensing module and the second feed dispensing module being adapted to be selectively fixed to the control module.

PRESENTATION OF THE DRAWINGS

Figure 2:
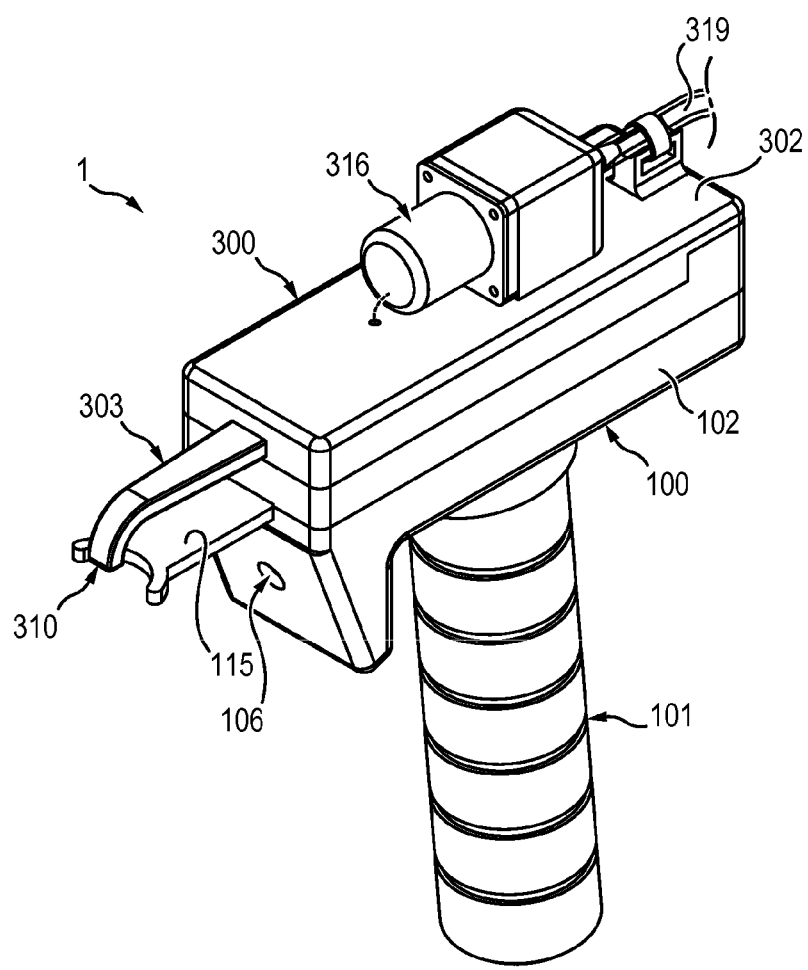
Figure 3:
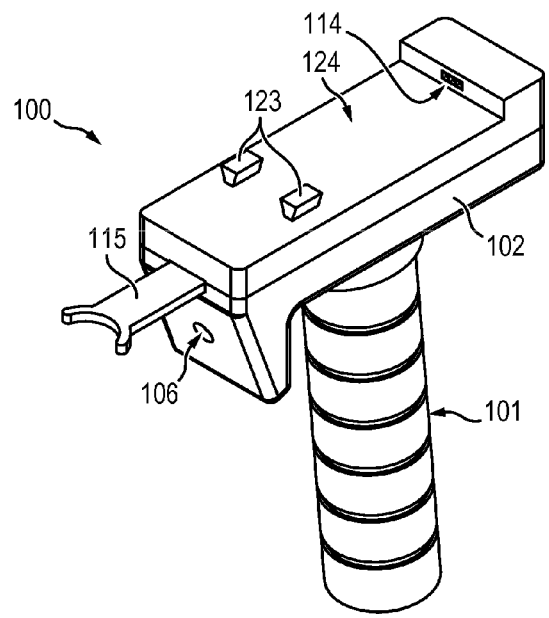
Figure 4:
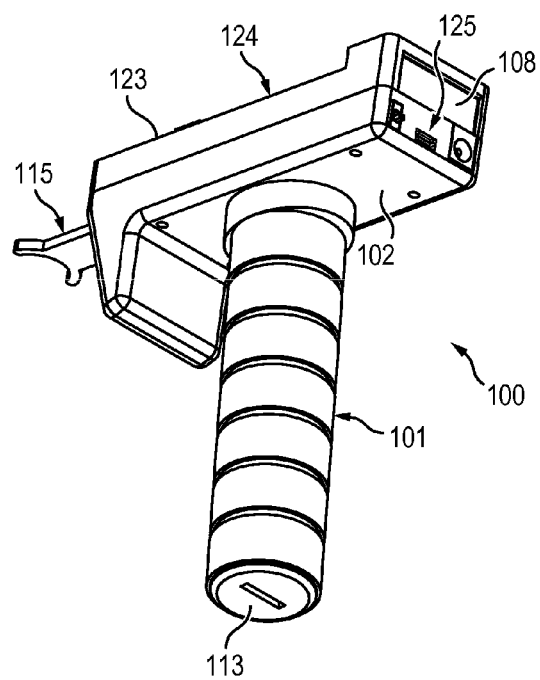
Figure 5:
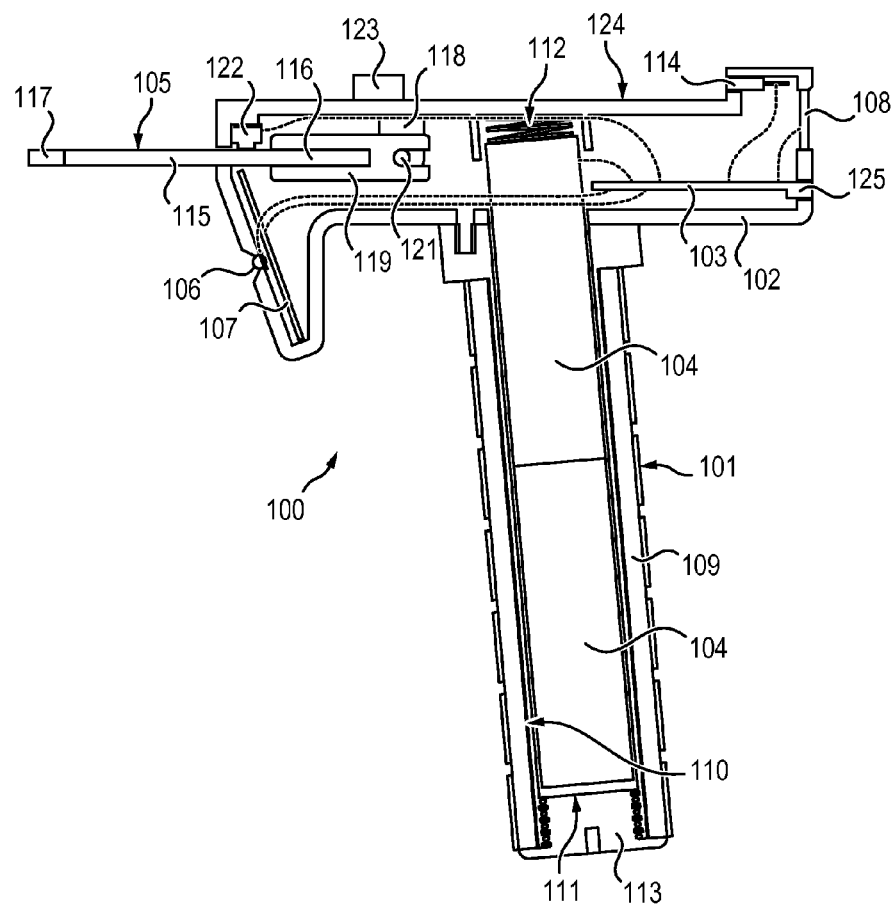
Figure 6:
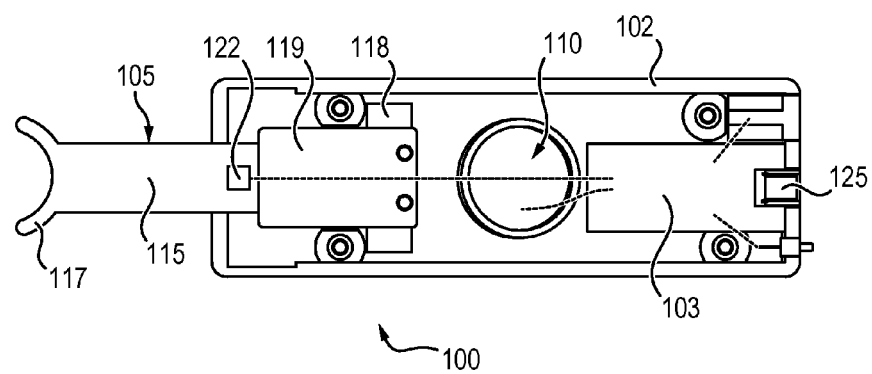
Figure 7:
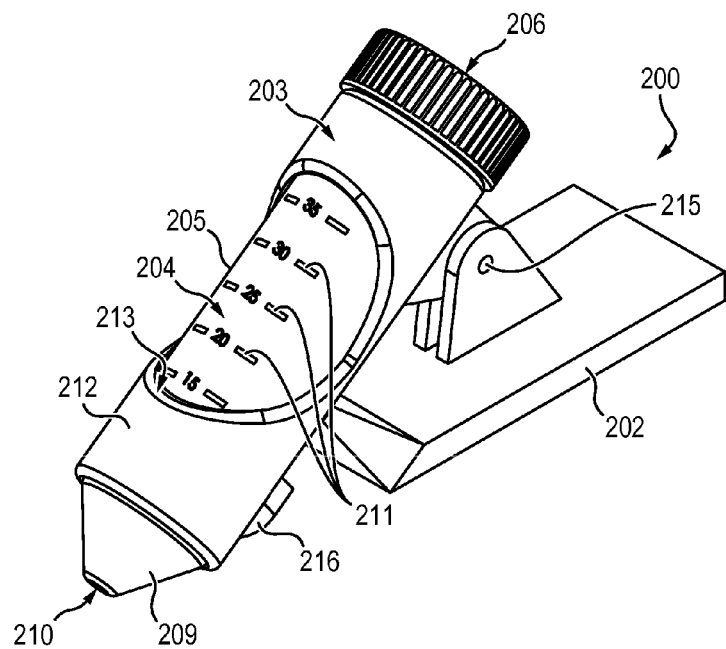
Figure 8:
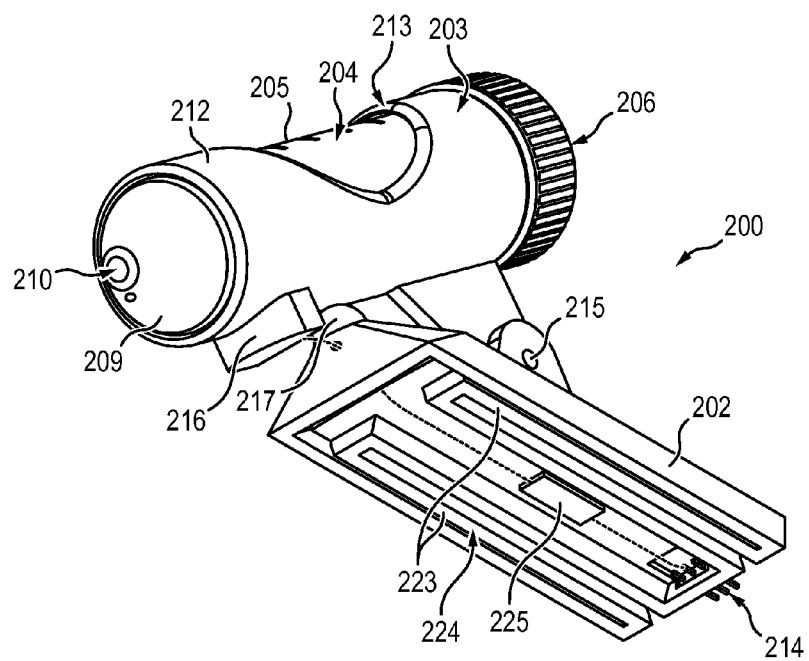
Figure 9:
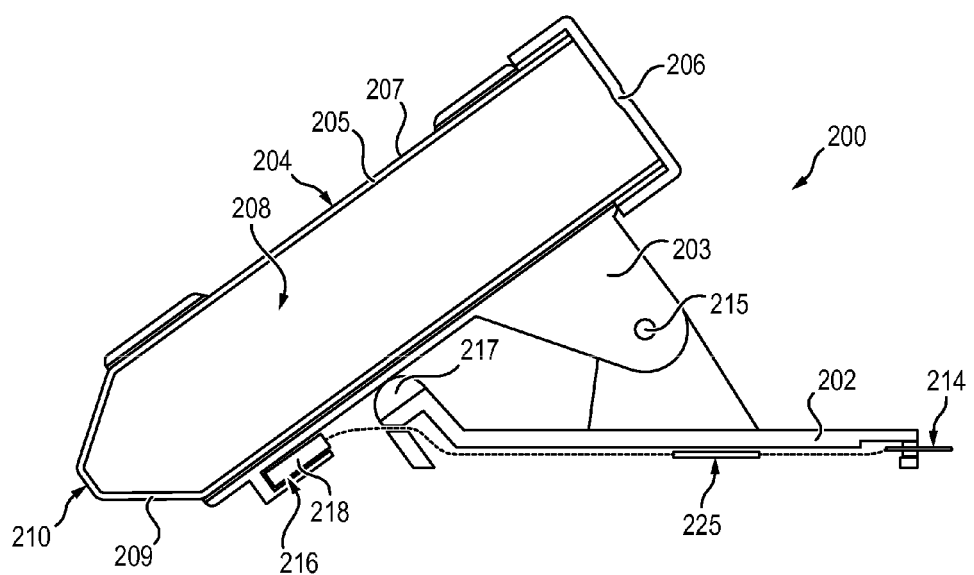
Figure 10:
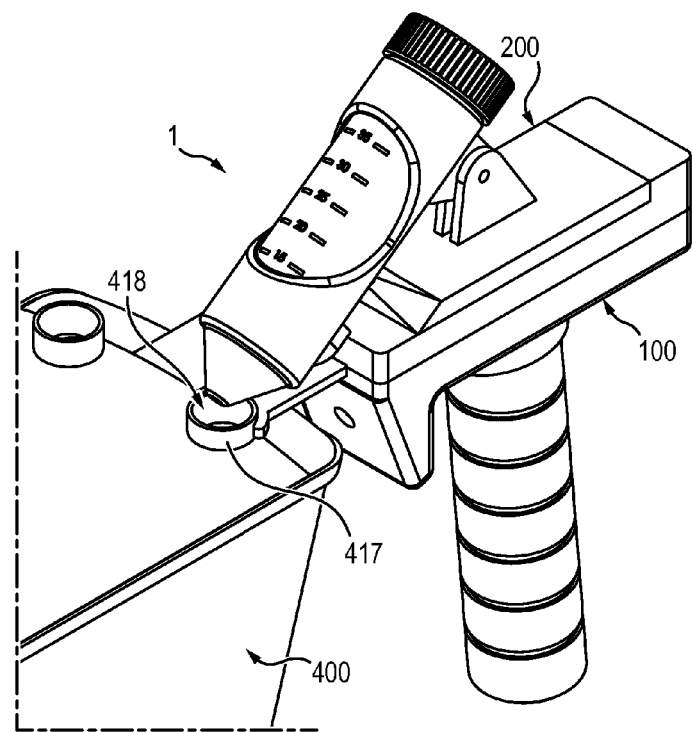
Figure 11:
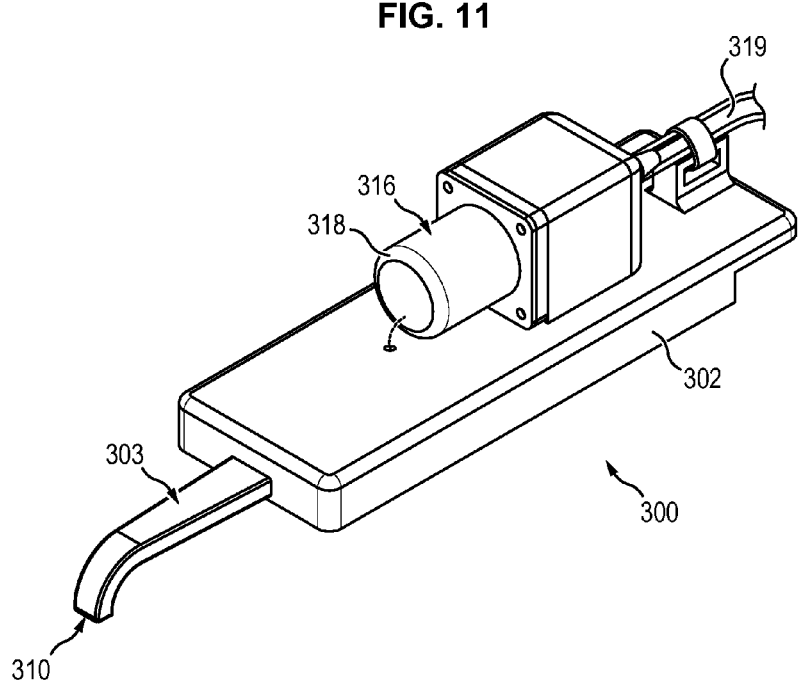
Figure 12:
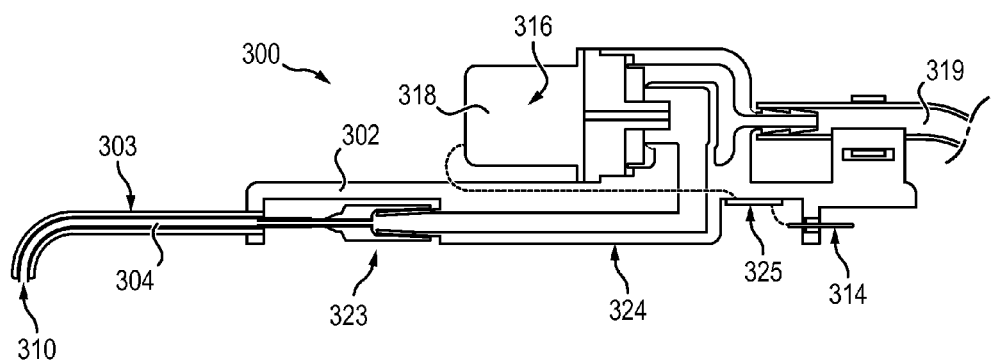
Figure 13:
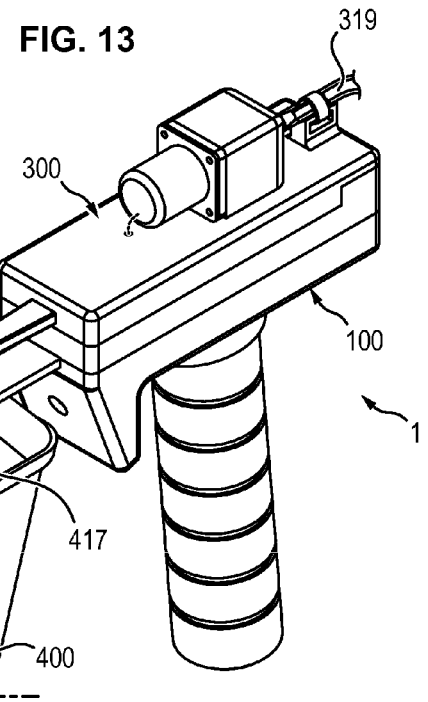
Figure 14:
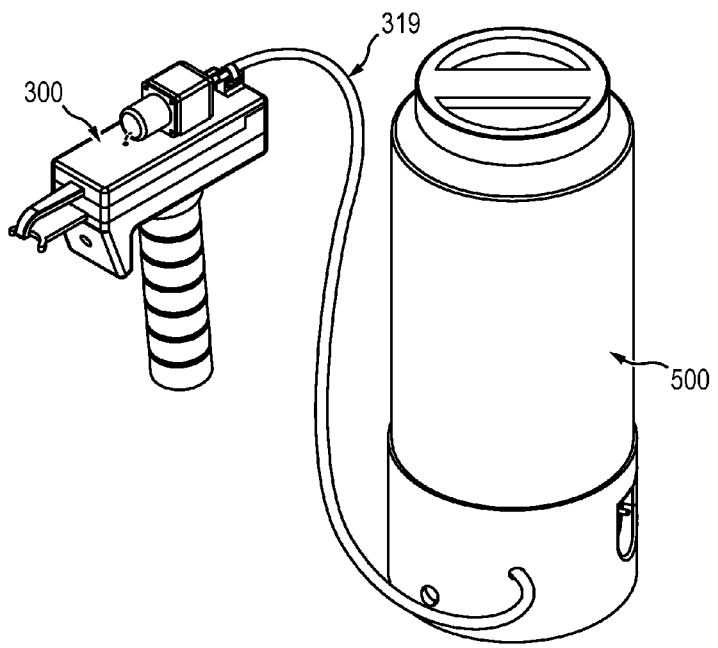
Figure 15:
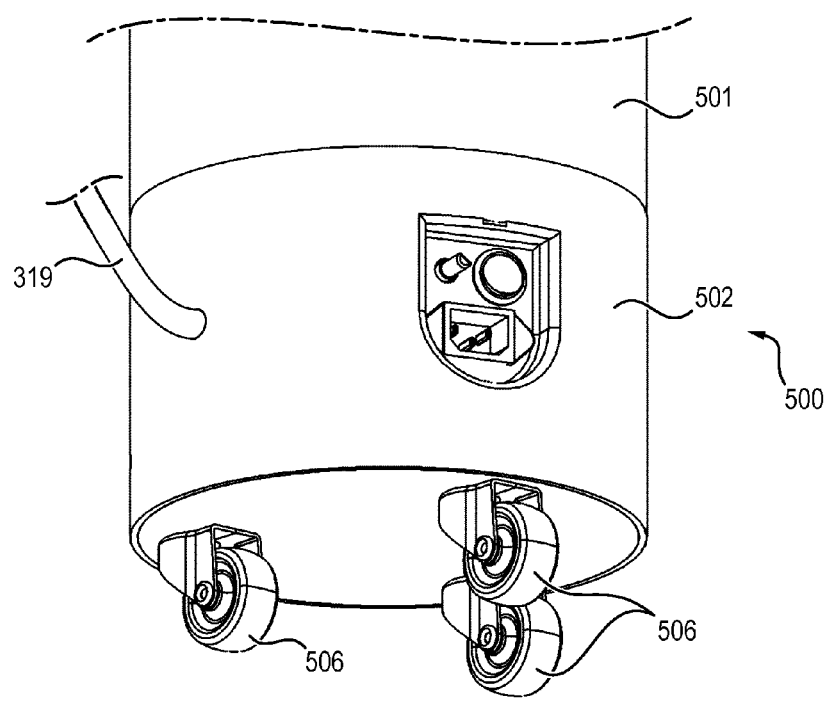
Figure 16:
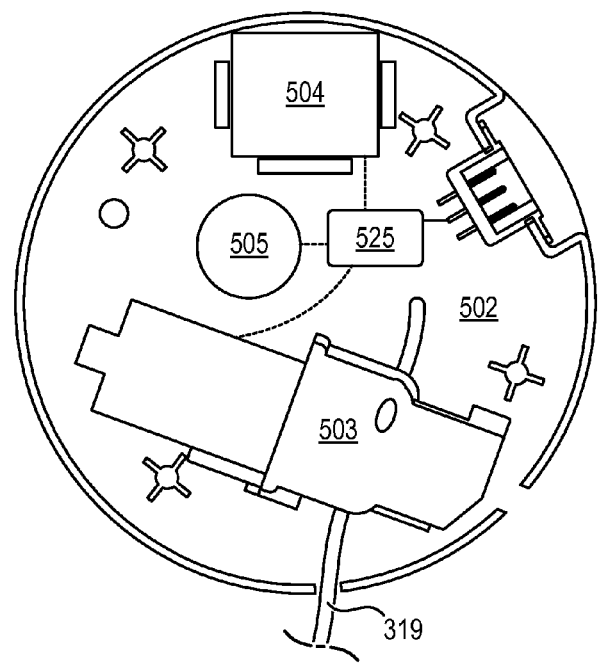

Other characteristics and advantages will emerge from the following description, which is purely illustrative and non-limiting and should be read in relation to the appended figures, among which:

FIG. 1 schematically represents an animal feed dispenser, according to a possible embodiment of the invention, in a first configuration allowing a dispensing of solid feed, FIG. 2 schematically represents the animal feed dispenser, in a second configuration allowing a dispensing of liquid feed, FIGS. 3 and 4 schematically represent a control module of the feed dispenser, FIG. 5 schematically represents a cross-sectional side view of the control module, FIG. 6 schematically represents a cross-sectional top view of the control module, FIGS. 7 and 8 schematically represent a first feed dispensing module allowing a dispensing of solid feed, FIG. 9 schematically represents a cross-sectional side view of the first feed dispensing module, FIG. 10 schematically represents the animal feed dispenser in use, FIG. 11 schematically represents a second feed dispensing module allowing a dispensing of liquid feed, FIG. 12 schematically represents a cross-sectional side view of the second feed dispensing module, FIG. 13 schematically represents the animal feed dispenser in use, FIG. 14 schematically represents the second feed dispensing module when it is coupled to a reservoir, FIG. 15 schematically represents the reservoir adapted to be coupled to the second feed dispensing module, FIG. 16 schematically represents a cross-sectional top view of the reservoir.

DETAILED DESCRIPTION OF ONE EMBODIMENT

FIGS. 1 and 2 schematically illustrate an animal feed dispenser 1 according to a possible embodiment of the invention.

In the embodiment illustrated in these figures, the feed dispenser 1 has two configurations: a first configuration, illustrated in FIG. 1, in which the feed dispenser 1 allows the dispensing of solid feed, such as feed in the form of powder or granules, and a second configuration, illustrated in FIG. 2, in which the feed dispenser 1 allows the dispensing of liquid feed, such as feed in the form of a solution containing small living organisms.

In the first configuration (FIG. 1), the feed dispenser 1 is formed of a control module 100 (or main module) and of a first feed dispensing module 200 removably fixed to the control module 100.

In the second configuration (FIG. 2), the feed dispenser 1 is formed of the same control module 100 and of a second feed dispensing module 300 different from the first feed dispensing module 200 and removably fixed to the control module 100.

FIGS. 3 to 6 more accurately represent the control module 100.

The control module 100 has the form of a gun. It comprises a handle 101 adapted to be grasped by an operator, and a casing 102 extending substantially perpendicularly to the handle 101.

The control module 100 further comprises an electronic control board 103, one or several battery/batteries 104, a detection member 105, a light source 106, a reader 107 and a display screen 108.

The electronic control board 103 is housed inside the casing 102. The electronic control board 103 is electrically coupled to the battery/batteries 104, to the detection member 105, to the light source 106, to the reader 107, and to the display screen 108.

The handle 101 has a generally cylindrical shape. It comprises a cylindrical body 109 delimiting an inner cavity 110 and an opening 111. The inner cavity 111 is adapted to receive the battery/batteries 104 for the supply of the feed dispenser with electrical energy. The battery/batteries 104 can be inserted into the inner cavity 110 via the opening 111. The control module 100 further comprises a spring 112 and a cap 113 making it possible to close off the opening 111. The battery/batteries 104 is/are held in place in the inner cavity 110 between the spring 112 and the cap 113. The cap 113 can be fixed to the body 109 of the handle 101 by screwing. The cap 113 can be unscrewed to allow replacement of the battery/batteries 104. As can be seen in FIG. 4, the cap 113 further includes a notch allowing the insertion of a screwdriver to facilitate the unscrewing.

The control module 100 further comprises a first connector 114 also connected to the electronic control board 103.

In the embodiment illustrated in FIGS. 3 to 6, the detection member 105 comprises a trigger 115 having a first end 116 extending inside the casing 102 and a second end 117 extending outside the casing 102.

The trigger 115 is rotatably mounted relative to the casing 102 at its first end 116. For this purpose, the control module 100 comprises a first part 118 fixed to the casing 102 and a second part 119 fixed to the trigger 115, one of the first part 118 and of the second part 119 having a groove 120 and the other of the first part 118 and of the second part 119 having a pin 121 extending inside the groove 120. The pin 121 is rotatably mounted inside the groove 120.

In the embodiment illustrated in FIGS. 3 to 6, the second end 117 of the trigger 115 has a C-shape adapted to bear on an annular rim surrounding an opening of an enclosure containing animals.

However, the trigger 115 can be replaced by another trigger having a second end 117 of a different shape. The first part 118 and the second part 119 indeed form a connection mechanism arranged to receive equally and interchangeably a trigger of a first type or a trigger of a second type, different from the first type.

The detection member 105 further comprises a switch 122 housed inside the casing 102 and electrically coupled to the electronic control board 103. The trigger 115 is movably mounted relative to the casing 102 between a first position in which the trigger 115 does not urge the switch 122 and a second position in which the trigger 115 urges the switch 122. The switch 122 is adapted to generate a detection signal when it is urged by the trigger 115 and to transmit the detection signal to the electronic control board 103.

The electronic control board 103 is adapted to control the light source 106, the reader 107 and the display screen 108, and to transmit an activation signal to the first connector 114, when it receives the detection signal.

The control module 100 further comprises a first fixing member 123, adapted to cooperate with a second fixing member 223 of the first feed dispensing module 200 or with a second fixing member 323 of the second feed dispensing module 300 in order to interchangeably fix the first 200 or the second 300 feed dispensing module to the control module 100. The first fixing member 123 comprises rails protruding on a planar upper surface 124 of the casing 102 intended to receive a feed dispensing module.

FIGS. 7 to 9 schematically represent the first feed dispensing module 200.

The first feed dispensing module 200 comprises a casing 202 adapted to be fixed to the casing 102 of the control module 100, a reservoir support 203, a reservoir for feed 204 and a second electrical connector 214.

The casing 202 of the first feed dispensing module 200 comprises a second fixing member 223, adapted to cooperate with the first fixing member 123 to fix the first feed dispensing module 200 on the control module 100. The second fixing member 223 comprises slides arranged in a planar lower surface 224 of the casing 202. The rails are adapted to be slidably engaged in the slides in order to fix the feed dispensing module 200 to the control module 100.

The first electrical connector 114 and the second electrical connector 214 are arranged so as to be engaged with each other when the first feed dispensing module 200 is fixed to the control module 100.

More specifically, the rails of the first fixing member 123 are adapted to slide in the slides of the second fixing member 223 along a sliding direction, and the second electrical connector 214 is adapted to be engaged with the first electrical connector 114 along a direction parallel to the sliding direction.

Once the second electrical connector 214 is engaged with the first electrical connector 114, the electronic control board 103 of the control module 100 detects the presence of the first feed dispensing module 200. For this purpose, the first feed dispensing module 200 comprises a first resistor located on an electronic plate 225 having a first value. The control module 100 and the feed dispensing module 200 form a voltage divider circuit able to detect the value of the first resistance when the first feed dispensing module 200 is fixed to the control module 100.

The reservoir 204 is adapted to contain solid feed to be dispensed. The reservoir 204 comprises a tube 205 and a cap 206. The tube 205 has a cylindrical side wall 207 delimiting a cavity 208 for receiving feed, and a cone-shaped bottom wall 209. The cavity 208 may have a volume equal for example to 60 milliliters. The tube 205 has a dispensing orifice 210 arranged at the top of the bottom wall 209. The dispensing orifice 210 has a diameter comprised between 1 and 4 millimeters, for example 2.4 millimeters. The diameter of the dispensing orifice 210 may vary depending on the size of the feed grains to be dispensed.

The wall 207 of the tube 205 has graduations 211 making it possible to visualize the amount of feed contained in the reservoir 204 when filling the reservoir.

The cap 206 is adapted to be aimed on the tube 205 to close the reservoir 204 after filling.

The reservoir support 203 is adapted to receive the reservoir 204. For this purpose, the reservoir support 203 comprises a tubular body 212 in which the reservoir 204 can be inserted. The body 212 has an opening 213 allowing the graduations 211 to be visible when the reservoir 204 is received in the support 203, which allows an operator to monitor the amount of feed remaining in the reservoir 204. The reservoir 204 can be easily replaced by another reservoir.

The reservoir support 203 is rotatably mounted on the casing 202 by means of a pivot connection 215. The pivot connection 215 has an axis of rotation substantially perpendicular to the direction of sliding of the rails in the slides. The axis of the pivot connection 215 is also substantially perpendicular to the axis of the handle 101 when the first feed dispensing module 200 is fixed to the control module 100.

The first feed dispensing module 200 further comprises an actuator 216 and a damping block 217.

In the case of the first feed dispensing module 200, the actuator 216 comprises a vibrator 218 fixed to the reservoir support 203. The vibrator 218 is electrically coupled to the second electrical connector 214, via the electronic module 225. When it is activated, the vibrator 218 is adapted to impart to the reservoir 204 mechanical vibrations causing a flow of feed from the inside of the reservoir 204 to the outside of the reservoir through the dispensing orifice 210.

The damping block 217 is disposed between the casing 202 of the feed dispensing module 200 and the reservoir support 203 and allows dampening the vibrations of the vibrator 218.

The pivot connection 215 between the reservoir support 203 and the casing 202 allows limiting the transmission of the vibrations from the support 203 to the casing 202.

In the first configuration of the feed dispenser, the first feed dispensing module 200 is fixed to the control module 100 (FIG. 1).

When an operator wishes to deliver solid feed into an enclosure 400 containing animals to be fed, he grasps the handle 101 and brings the trigger 115 closer to the enclosure 400. As illustrated in FIG. 10, the operator positions the C-shaped end 117 of the trigger 115 bearing against an annular rim 417 surrounding an opening 418 of the enclosure 400 containing the animals. In this position, the dispensing opening 210 of the reservoir 204 is located above the opening of the enclosure. The C-shaped end of the trigger thus allows the operator to correctly position the dispensing opening 210 relative to the opening 418 of the enclosure 400.

The operator uses the weight of dispenser 1 in order to pivot the trigger 115 relative to the casing 102 of the control module 100.

The trigger 115 thus switches from the first position in which the trigger 115 does not urge the switch 122 to the second position in which the trigger 115 urges the switch 122.

When the trigger 115 urges the switch 122, the switch 122 generates a detection signal which is transmitted to the electronic control board 103.

The feed dispenser 1 is adapted to operate selectively according to two operating modes: a first operating mode (or "manual" operating mode) and a second operating mode (or "automatic" operating mode).

According to the first operating mode, when the electronic control board 103 receives the detection signal, the electronic control board 103 is programmed to perform the following steps:

the electronic control board 103 transmits to the actuator 216 an activation signal via the first connector 114 and the second connector 214, simultaneously, the electronic control board 103 controls the display screen 108 to display a value of the dispensed amount of feed, and simultaneously, the electronic control board 103 controls the light source 106 so that the light source 106 emits light, as long as the activation signal is transmitted to the actuator.

When the actuator 216 receives the activation signal, the actuator 216 initiates a flow of feed through the dispensing orifice 210. More specifically, the activation signal has the effect of activating the vibrator 218 so that the vibrator 218 generates vibrations. The vibrations imparted to the feed reservoir 204 have the effect that feed contained in the reservoir 204 flows through the dispensing orifice 210 towards the enclosure 400.

As long as the trigger 115 urges the switch 122, the electronic control board 102 activates the actuator 216 and feed is continuously dispensed at a constant rate. The display screen 108 displays the value of the dispensed amount of feed in real time. The value of the dispensed amount of feed can for example be displayed in the form of a value of feed volume, feed weight and/or number of fed animals.

When the desired amount of feed has been dispensed, the operator ends the dispensing. To this end, it moves the trigger 115 away from the enclosure 400, so that the trigger 115 stops urging the switch 122. The actuator 216 no longer receives an activation signal, the vibrator 218 no longer imparts vibrations to the reservoir 204 and the dispensing of feed stops.

According to the second operating mode, when the electronic control board 103 receives the detection signal, the electronic control board 103 is programmed to perform the following step:

the electronic control board 103 controls the reader 107 so that the reader 107 reads information identifying the enclosure and/or information relating to the number of animals contained in the enclosure.

The reader 107 can for example be an optical reader, such as a bar code reader for example. In this case, the enclosure 400 has a label on which the information is written, in the form of a bar code for example. The information appearing on the enclosure 400 may be representative of a code identifying the enclosure 400 or of a number of animals contained in the enclosure 400, this information being able to be read by the optical reader 107.

Alternatively, the reader 107 can be a radiofrequency reader, of the RFID type. In this case, the enclosure 400 has an RFID label in which the information is recorded. When it receives a radiofrequency excitation signal emitted by the RFID reader 107, the RFID label is adapted to generate a response signal representative of a code identifying the enclosure 400 or of a number of animals contained in the enclosure 400.

The reader 107 generates a signal representative of the information read and transmits the signal to the electronic control board 103.

The electronic control board 103 is programmed to perform the following steps:

the electronic control board 103 calculates a value of the amount of feed to be dispensed based on the information read, for example the information relating to the number of animals contained in the enclosure, the electronic control board 103 transmits to the actuator 216 an activation signal via the first electrical connector 114 and the second electrical connector 214, simultaneously, the electronic control board 103 controls the light source 106 so that the light source 106 emits light, the light being emitted as long as the activation signal is transmitted to the actuator 216, simultaneously, the electronic control board 103 controls the display screen 108 to display a value of the dispensed amount of feed, and when the value of the dispensed amount of feed reaches the previously calculated amount value, the electronic control board 103 stops transmitting the activation signal so that the dispensing of feed stops.

In a variant, the electronic control board 103 is programmed to perform the following steps:

the electronic control board 103 calculates a duration of the activation signal based on the information read, for example information relating to the number of animals contained in the enclosure 400, the electronic control board 103 transmits to the actuator 216 an activation signal via the first electrical connector 114 and the second electrical connector 214, simultaneously, the electronic control board 103 controls the light source 106 so that the light source 106 emits light, as long as the activation signal is transmitted to the actuator 216, simultaneously, the electronic control board 103 controls the display screen 108 to display a value of the dispensed amount of feed, and when the duration of the activation signal reaches the previously calculated duration of the activation signal, the electronic control board 103 stops transmitting the activation signal so that the dispensing of feed stops.

As long as the actuator 216 receives the activation signal, the actuator 216 generates a flow of feed through the dispensing orifice. Specifically, the activation signal has the effect of activating the vibrator 218 so that the vibrator 218 generates vibrations. The vibrations imparted to the feed reservoir 204 have the effect that feed contained in the reservoir 204 flows continuously and at a monitored rate through the dispensing orifice 210 towards the enclosure 400.

In this second operating mode (or "automatic" operating mode), the dispensing of feed stops automatically when an appropriate amount of feed has been dispensed, this amount depending on the information read by the reader 107.

However, the flow of feed may be interrupted if the operator unexpectedly moves the trigger 115 away from the enclosure 400 and if the trigger 115 stops urging the switch 122 during dispensing.

During the dispensing of feed, the display screen 108 displays the dispensed amount of feed in real time.

The light source 106 allows illuminating the surface of the water contained in the enclosure 400 in a grazing manner so that the operator can visualize the dispensed feed during the dispensing.

The electronic control board 103 can include a memory allowing feeding data to be recorded as the dispensing progresses. These feeding data can include, for example, an identifier of the enclosure 400 in which feed has been delivered, the date and time of feeding and the amount of feed delivered. These data can be transmitted to an external computer server and be archived for health monitoring.

The electronic control board 103 can further detect, when an enclosure 400 has already been the object of a recent dispensing, and inhibit the activation signal in order to prevent the initiation of the dispensing. Conversely, the dispenser can warn the operator when an enclosure has not received feed at the end of the feeding process. In this way, the feeding errors can be reduced. In addition, the use of the feed dispenser 1 is more flexible since the dispensing can be interrupted and then resumed by another operator without risk of error.

FIGS. 11 and 12 schematically represent the second feed dispensing module 300.

The second feed dispensing module 300 comprises a casing 302, a feed dispensing nozzle 303, an actuator 316, and a second electrical connector 314.

Like the first feed dispensing module 200, the casing 302 of the second feed dispensing module 300 comprises a second fixing member 323, adapted to cooperate with the first fixing member 123 to detachably fix the second feed dispensing module 300 on the control module 100. The second fixing member 323 comprises slides, the rails of the control module 100 being adapted to be slidably engaged in the slides 123 to fix the second feed dispensing module 300 on the control module 100.

The first electrical connector 114 and the second electrical connector 314 are arranged to be engaged with each other when the second feed dispensing module 300 is fixed to the control module 100.

More specifically, the rails of the first fixing member 123 are adapted to slide in the slides of the second fixing member 323 along a sliding direction, and the second connector 314 is adapted to be engaged with the first connector 114 along a direction parallel to the sliding direction.

Once the second electrical connector 314 is engaged with the first electrical connector 114, the electronic control board 103 of the control module 100 detects the presence of the second feed dispensing module 300. For this purpose, the second feed dispensing module 300 comprises a second resistance located on an electronic plate 325 and having a second value, different from the first value. The voltage divider circuit formed by the control module 100 and the second feed dispensing module 300 is adapted to detect the value of the second resistance when the second feed dispensing module 300 is fixed to the control module 100.

A dispensing channel 304 extends inside the dispensing nozzle 303 up to a dispensing orifice 310. The dispensing channel may be formed by a hose extending inside the dispensing nozzle 303. The dispensing nozzle 303 and the hose can be replaced if necessary.

The actuator 316 comprises a valve 318 having a closed position in which the valve 318 prohibits circulation of feed in the dispensing channel 304 and an open position in which the valve 318 authorizes circulation of feed in the dispensing channel 304.

The valve 318 is electrically coupled to the second electrical connector 314, via the electronic board 325. In this way, the opening of the valve 318 can be controlled by the electronic control board 103 of the control module 100 when the second connector 314 is engaged with the first connector 114.

As illustrated in FIG. 14, the dispensing channel 304 is adapted to be coupled to an external reservoir 500 containing liquid feed to be dispensed via a coupling tube 319.

FIGS. 15 and 16 schematically represent the feed reservoir 500 adapted to be coupled to the second feed dispensing module 300.

The reservoir 500 comprises walls 501 delimiting a cavity adapted to contain liquid feed. The cavity can for example contain 8 liters of liquid feed.

The reservoir 500 further comprises a compartment 502, adjacent to the cavity, as well as a pump 503, a battery 504 and a stirrer 505 contained in the compartment 502.

The battery 504 is adapted to supply the pump 503 and the stirrer 505 with electrical energy.

When activated, the pump 503 is adapted to inject the liquid feed from the inside of the reservoir 500 towards the dispensing channel 304 via the coupling tube 319. The pump 503 can include a pressure regulator which has the effect that the pump 503 starts automatically when the pressure in the coupling tube 319 is lower than a predetermined pressure threshold, and stops when the pressure in the coupling tube 319 reaches the pressure threshold.

The stirrer 505 is adapted to mix liquid feed contained inside the cavity 501 of the reservoir 500. The stirrer 505 may be a magnetic stirrer, comprising a first magnet rotated by a motor. The first magnet in rotation generates a rotating magnetic field which causes the rotation of a second magnet disposed inside the cavity 501. The stirrer 505 ensures homogenization of the liquid feed to maintain a homogeneous concentration of living organisms.

The reservoir 500 may further have casters 506 to facilitate the displacement of the reservoir 500 between the racks.

In the second configuration of the feed dispenser 1, the second feed dispensing module 300 is fixed to the control module 100 (FIG. 2).

When an operator wishes to deliver feed into an enclosure 400 containing animals, he grasps the handle 101 of the control module 100 and brings the trigger 115 closer to the enclosure 400 containing animals to be fed. As illustrated in FIG. 13, the operator bears the C-shaped end 117 of the trigger 115 on an annular rim 417 surrounding an opening 418 of the enclosure 400 containing the animals. In this position, the dispensing orifice 310 of the nozzle 303 is located above the opening 418 of the enclosure 400. The C-shaped end 117 of the trigger 115 thus allows the operator to correctly position the dispensing orifice 310 relative to the enclosure 400.

As in the first configuration, the operator uses the weight of the dispenser 1 to pivot the trigger 115 relative to the casing 102 of the control module 100.

The trigger 115 switches from the first position in which the trigger does not urge the switch 122 to the second position in which the trigger 115 urges the switch 122.

When the trigger 115 urges the switch 122, the switch 122 generates a detection signal which is transmitted to the electronic control board 103.

The feed dispenser 1 is adapted to operate according to the two operating modes described above: a first operating mode (or "manual" operating mode) and a second operating mode (or "automatic" operating mode).

According to the first operating mode, when it receives the detection signal, the electronic control board 103 is programmed to perform the following steps:

the electronic control board 103 transmits to the actuator 316 an activation signal via the first connector 114 and the second connector 314, the electronic control board 103 controls the display screen 108 to display a value of the dispensed amount of feed, and the electronic control board 103 controls the light source 106 so that the light source 106 emits light, as long as the activation signal is transmitted to the actuator 316.

When the actuator 316 receives the activation signal, the actuator 316 initiates a flow of feed through the dispensing orifice 310. More specifically, the activation signal has the effect of switching the valve 318 from the closed position to the open position. Once the valve 318 is in the open position, feed contained in the reservoir 500 is injected by the pump 503 via the coupling tube 319 and the dispensing channel 304 towards the dispensing orifice 310. This has the effect that feed contained in the reservoir 500 flows via the coupling tube 319, the dispensing channel 304, and through the dispensing orifice 310 towards the enclosure 400.

As long as the trigger 115 urges the switch 322, the electronic control board 103 activates the actuator 316 and feed is dispensed. The display screen 108 displays the value of the dispensed amount of feed in real time. The feed amount value can be displayed in the form of a feed volume value, feed weight and/or number of fed animals.

When the desired amount of feed has been dispensed, the operator moves the trigger 115 away from the enclosure 400, so that the trigger 115 stops urging the switch 122. In the absence of an activation signal, the valve 318 switches from the open position to the closed position and the dispensing of feed stops.

According to the second operating mode ("automatic" operating mode), when it receives the detection signal, the electronic control board 103 is programmed to perform the following step:

the electronic control board 103 controls the reader 107 so that the reader 107 reads information identifying the enclosure 400 and/or information relating to the number of animals contained in the enclosure.

The optical reader 107 generates a signal representative of the information read and transmits the signal to the electronic control board 103.

The electronic control board 103 is programmed to perform the following steps:

the electronic control board 103 calculates a value of the dispensed amount of feed based on the information read, for example information relating to the number of animals contained in the enclosure 400, the electronic control board 103 transmits to the actuator 316 an activation signal via the first connector 114 and the second connector 314, simultaneously, the electronic control board 103 controls the light source 106 so that the light source 106 emits light, as long as the activation signal is transmitted to the actuator 316, simultaneously, the electronic control board 103 controls the display screen 108 to display a value of the dispensed amount of feed, and when the value of the dispensed amount of feed reaches the previously calculated amount value, the electronic control board 103 stops transmitting the activation signal so that the valve 318 switches from the open position to the closed position and the dispensing of feed stops.

Alternatively, the electronic control board 103 is programmed to perform the following steps:

the electronic control board 103 calculates a duration of the activation signal based on the read information, for example information relating to the number of animals contained in the enclosure 400, the electronic control board 103 transmits to the actuator 316 an activation signal via the first connector 114 and the second connector 314, simultaneously, the electronic control board 103 controls the light source 106 so that the light source 106 emits light, as long as the activation signal is transmitted to the actuator 36, simultaneously, the electronic control board 103 controls the display screen 108 to display a value of the dispensed amount of feed, and when the duration of the activation signal reaches the previously calculated duration of the activation signal, the electronic control board 103 stops transmitting the activation signal so that the dispensing of feed stops.

As long as the actuator 316 receives the activation signal, the actuator 316 generates a flow of feed through the dispensing orifice 310. More specifically, the activation signal has the effect of holding the valve 318 in the open position so that feed contained in the reservoir 500 flows continuously and with a monitored rate through the dispensing orifice 310 towards the enclosure 400.

In this second operating mode, the dispensing of feed stops automatically when an appropriate amount of feed, based on the information read by the reader, has been dispensed.

However, the flow of feed can be interrupted if the operator unexpectedly moves the trigger 115 away from the enclosure 400 and if the trigger 115 stops urging the switch 122 during dispensing.

The display screen 108 displays the dispensed amount of feed in real time.

In the embodiment which has just been described with reference to FIGS. 1 to 16, the feed dispenser 1 comprises a control module 100 (or main module) and at least one feed dispensing module 200 or 300, separate from the control module 100. The feed dispensing module 200 or 300 can be removably fixed to the control module 100. Particularly, in this embodiment, the dispensing module 200 or 300 comprises a casing 202 or 302, separate from the casing 102 of the control module 100, and can be fixed thereto by means of fixing members 123 and 223 or 323.

However, in another embodiment, the feed dispenser 1 can comprise a control module 100 and a feed dispensing module 200 (or 300) inseparable from each other. Particularly, the two modules can comprise a common casing (instead of two separate casings).

In the case where the feed dispenser 1 is a solid feed dispenser, the feed dispenser 1 comprises a casing which contains the electronic control board 103, the battery/batteries 104, the detection member 105, the light source 106, the reader 107 and the display screen 108, and to which is fixed the reservoir support 203 intended to receive the reservoir for feed 204.

In the case where the feed dispenser 1 is a liquid feed dispenser, the feed dispenser 1 comprises a casing which contains the electronic control board 103, the battery/batteries 104, the detection member 105, the light source 106, the reader 107 and the display screen 108, and to which is fixed the feed dispensing nozzle 303 intended to deliver the liquid feed.

In this embodiment, the feed dispenser does not comprise the fixing members 123, 223 or 323, or the electrical connectors 114, 214 or 314.

The invention claimed is:

1. An animal feed dispenser, comprising:
a control module comprising a casing, a detection member and an electronic control board, the detection member comprising a trigger and a switch, the trigger is moveably mounted relative to the casing between a first position in which the trigger does not urge the switch and a second position in which the trigger urges the switch, the trigger adapted to be moved from the first position to the second position when the first end of the trigger is brought into contact with an enclosure containing animals, the detection member being adapted to generate a detection signal when the feed dispenser is located in the vicinity of the enclosure containing animals; and
a feed dispensing module comprising a feed dispensing orifice and an actuator,
wherein the electronic control board of the control module is configured to receive the detection signal and based on the detection signal, transmit to the actuator an activation signal, and the actuator is configured to initiate, when receiving the activation signal, a flow of feed through the dispensing orifice.

2. The dispenser according to claim 1, wherein a first end of the trigger is located exterior to the casing and a second end of the trigger is located interior to the casing.

3. The dispenser according to claim 1, wherein the trigger is rotatably mounted relative to the casing between the first position and the second position.

4. The dispenser according to claim 1, wherein the control module comprises a mechanism for connecting the trigger to the casing arranged to equally and interchangeably couple a trigger of a first type or a trigger of a second type different from the first type.

5. The dispenser according to claim 1, wherein the trigger comprises a C-shaped end adapted to bear on an annular rim surrounding an opening in the enclosure containing the animals.

6. The dispenser according to claim 1, wherein the electronic control board is configured to transmit the activation signal to the actuator, as long as the detection member generates the detection signal, and to stop the transmission of the activation signal as soon as the detection member no longer generates a detection signal.

7. The dispenser according to claim 1, wherein the electronic control board is configured to transmit the activation signal to the actuator during an activation period calculated based on information relating to the number of animals contained in the enclosure.

8. The dispenser according to claim 7, comprising a reader adapted to read information relating to the number of animals contained in the enclosure and to transmit the information to the electronic control board, the electronic control board being adapted to calculate a value of the amount of feed to be dispensed and/or a duration of the activation signal based on the information relating to the number of animals contained in the enclosure.

9. The dispenser according to claim 1, comprising a display screen, the electronic control board being adapted to control the display screen so that the screen displays in real time a value of the dispensed amount of feed as feed flows through the dispensing orifice.

10. The dispenser according to claim 1, wherein the feed dispensing module is adapted to be fixed to the control module, and wherein the control module comprises a first electrical connector and the feed dispensing module comprises a second electrical connector, the first electrical connector and the second electrical connector being arranged so as to be engaged with each other when the feed dispensing module is fixed to the control module, the activation signal being transmitted to the actuator via the first electrical connector and the second electrical connector.

11. The dispenser according to claim 1, wherein the control module comprises a first fixing member and the feed dispensing module comprises a second fixing member, adapted to cooperate with the first fixing member in order to fix the feed dispensing module to the control module.

12. The dispenser according to claim 11, wherein one of the first fixing member and of the second fixing member comprises rails and the other of the first fixing member and of the second fixing member comprises slides, the rails being adapted to slide in the slides in order to fix the feed dispensing module to the control module.

13. The dispenser according to claim 10, wherein the control module comprises a first fixing member and the feed dispensing module comprises a second fixing member, and one of the first fixing member and of the second fixing member comprises rails and the other of the first fixing member and of the second fixing member comprises slides, the rails being adapted to slide in the slides along a sliding direction in order to fix the feed dispensing module to the control module, and the second connector being adapted to be engaged with the first connector along a direction parallel to the sliding direction.

14. The dispenser according to claim 1, wherein the control module comprises a handle adapted to be grasped by an operator in order to position the dispenser vis-à-vis the enclosure containing the animals.

15. The dispenser according to claim 1, wherein the feed dispensing module comprises a reservoir adapted to contain feed to be dispensed and wherein the actuator comprises a vibrator which is adapted, when the actuator of the feed dispensing module receives the activation signal, to impart to the reservoir mechanical vibrations causing a flow of feed from the inside of the reservoir to the outside of the reservoir through the dispensing orifice.

16. The dispenser according to claim 15, wherein the feed dispensing opening is arranged on a wall of the reservoir.

17. The dispenser according to claim 15, wherein the feed dispensing module comprises a casing and a support adapted to receive the reservoir, the support being rotatably mounted on the casing.

18. The dispenser according to claim 17, wherein the feed dispensing module comprises a damping block disposed between the casing of the feed dispensing module and the support.

19. The dispenser according to claim 1, wherein the feed dispensing module comprises a dispensing nozzle and a dispensing channel extending inside the dispensing nozzle up to the dispensing orifice, and wherein the actuator comprises a valve having a closed position in which the valve prohibits circulation of feed in the dispensing channel and an open position in which the valve authorizes circulation of feed in the dispensing channel, the valve being adapted to switch from the closed position to the open position when the actuator of the feed dispensing module receives the activation signal.

20. The dispenser according to claim 19, further comprising a reservoir adapted to contain feed to be dispensed, and a coupling tube adapted to couple the reservoir to the dispensing channel.

21. The dispenser according to claim 20, comprising a pump adapted to inject feed from the inside of the reservoir to the dispensing channel via the coupling tube.

22. The dispenser according to claim 20, comprising a stirrer adapted to mix feed contained inside the reservoir.

23. A control module for an animal feed dispenser, comprising a detection member, an electronic control board, a first electrical connector, and a handle adapted to be grasped by an operator, the detection member being adapted to generate a detection signal when the feed dispenser is located in the vicinity of an enclosure containing animals, and the first electrical connector being adapted to be engaged with a second electrical connector of a feed dispensing module when the feed dispensing module is fixed to the control module, and wherein the electronic control board of the control module is configured to receive the detection signal and, based on the detection signal, to transmit to the feed dispensing module an activation signal via the first connector and the second connector with a view to initiating a flow of feed via a dispensing orifice of the feed dispensing module.

24. A feed dispensing module for an animal feed dispenser, the feed dispensing module being adapted to be fixed to a control module and comprising a feed dispensing orifice, an actuator and a second electrical connector, the second electrical connector being adapted to be engaged with a first electrical connector of the control module when the feed dispensing module is fixed to the control module, and wherein the actuator is adapted to receive an activation signal transmitted by the control module via the first connector and the second connector and is configured to initiate, when receiving the activation signal, a flow of feed through the dispensing orifice.

25. An animal feed dispenser set, comprising:

the control module according to claim 23, a first feed dispensing module for dispensing solid feed, for a first animal feed dispenser, the first feed dispensing module being adapted to be fixed to the control module and comprising a feed dispensing orifice, an actuator and the second electrical connector, the second electrical connector being adapted to be engaged with the first electrical connector of the control module when the first feed dispensing module is fixed to the control module, and wherein the actuator is adapted to receive the activation signal transmitted by the control module via the first connector and the second connector and is configured to initiate, when receiving the activation signal, a flow of solid feed through the feed dispensing orifice, and a second feed dispensing module for dispensing liquid feed, for a second animal feed dispenser, the second feed dispensing module being adapted to be fixed to the control module and comprising a feed dispensing orifice, an actuator and a second electrical connector, the second electrical connector being adapted to be engaged with a first electrical connector of the control module when the second feed dispensing module is fixed to the control module, and wherein the actuator is adapted to receive an activation signal transmitted by the control module via the first electrical connector and the second electrical connector and is configured to initiate, when receiving the activation signal, a flow of liquid feed through the feed dispensing orifice, the first feed dispensing module and the second feed dispensing module being adapted to be selectively fixed to the control module.

* * * * *